United States Patent
Shields et al.

(10) Patent No.: US 10,331,708 B2
(45) Date of Patent: Jun. 25, 2019

(54) DYNAMIC AWARENESS INVOLVING LOCATION

(75) Inventors: Kevin T. Shields, Bellevue, WA (US); William T. Flora, Seattle, WA (US); Bret P. O'Rourke, Kirkland, WA (US); John Mark Miller, Kirkland, WA (US); Eric P. Wilfrid, Mountain View, CA (US); Nigel S. Keam, Redmond, WA (US); Steven N. Bathiche, Kirkland, WA (US); Oliver R. Roup, Seattle, WA (US); Zachary L. Russell, Belleve, WA (US); Jon Marcus Randall Whitten, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1108 days.

(21) Appl. No.: 11/771,369

(22) Filed: Jun. 29, 2007

(65) Prior Publication Data

US 2009/0005079 A1    Jan. 1, 2009

(51) Int. Cl.
*H04W 4/02* (2018.01)
*G06F 16/29* (2019.01)
*H04W 4/20* (2018.01)
*H04W 64/00* (2009.01)

(52) U.S. Cl.
CPC .............. *G06F 16/29* (2019.01); *H04W 4/02* (2013.01); *H04W 4/20* (2013.01); *H04W 64/00* (2013.01)

(58) Field of Classification Search
CPC ........... H04W 4/22; H04W 4/02; H04W 4/06; H04W 76/007; H04W 64/00; H04W 76/002; H04W 4/021; H04W 4/18; H04W 48/08; H04W 4/20; H04W 48/10; H04W 48/14; H04W 4/023; H04L 65/4076; G06Q 30/02; G06Q 20/20; G06Q 30/0261
USPC .. 455/456.3, 456.1, 404.1, 404.2, 418, 3.06, 455/410, 452.1, 456.2, 457
See application file for complete search history.

(56) References Cited

U.S. PATENT DOCUMENTS

| | | | |
|---|---|---|---|
| 6,353,398 B1 | 3/2002 | Amin et al. | |
| 6,672,506 B2 | 1/2004 | Swartz et al. | |
| 6,741,188 B1 | 5/2004 | Miller et al. | |
| D494,584 S | 8/2004 | Schlieffers et al. | |
| 6,796,505 B2 | 9/2004 | Pellaumail et al. | |
| 6,837,436 B2 | 1/2005 | Swartz et al. | |
| 6,847,823 B2 * | 1/2005 | Lehikoinen et al. | 455/456.1 |
| 6,944,447 B2 * | 9/2005 | Portman et al. | 455/422.1 |
| 7,010,501 B1 | 3/2006 | Roslak et al. | |
| 7,040,541 B2 | 5/2006 | Swartz et al. | |
| 7,063,263 B2 | 6/2006 | Swartz et al. | |
| 7,171,378 B2 | 1/2007 | Petrovich et al. | |
| 7,195,157 B2 | 3/2007 | Swartz et al. | |
| 7,385,501 B2 | 6/2008 | Miller et al. | |
| 2001/0030664 A1 | 10/2001 | Shulman et al. | |
| 2004/0201500 A1 | 10/2004 | Miller et al. | |
| 2004/0235493 A1 * | 11/2004 | Ekerborn | 455/456.1 |

(Continued)

*Primary Examiner* — Fred A Casca
(74) *Attorney, Agent, or Firm* — Medley, Behrens & Lewis, LLC

(57) ABSTRACT

A system for dynamic content delivery is provided. The system includes a control component to determine location, preferences, and state of a user. A delivery component dynamically selects and provides content to the user as a function of the user's location, preferences, and state.

20 Claims, 12 Drawing Sheets

(56) References Cited

U.S. PATENT DOCUMENTS

| | | | |
|---|---|---|---|
| 2005/0143097 A1* | 6/2005 | Wilson et al. | 455/456.3 |
| 2005/0258943 A1* | 11/2005 | Mian et al. | 340/426.1 |
| 2005/0266858 A1 | 12/2005 | Miller et al. | |
| 2005/0272442 A1 | 12/2005 | Miller et al. | |
| 2006/0015254 A1* | 1/2006 | Smith | 702/3 |
| 2006/0019676 A1 | 1/2006 | Miller et al. | |
| 2006/0075023 A1* | 4/2006 | Tenereillo | 709/205 |
| 2006/0080360 A1* | 4/2006 | Young et al. | 707/104.1 |
| 2007/0043459 A1 | 2/2007 | Abbott et al. | |
| 2007/0066311 A1* | 3/2007 | Reibel | H04W 52/0261 455/445 |
| 2007/0072583 A1* | 3/2007 | Barbeau et al. | 455/404.2 |
| 2007/0247289 A1* | 10/2007 | Buckley et al. | 340/426.3 |
| 2007/0296575 A1* | 12/2007 | Eisold et al. | 340/539.16 |
| 2008/0057988 A1* | 3/2008 | Lovell, Jr. | 455/466 |
| 2008/0090591 A1 | 4/2008 | Miller et al. | |
| 2008/0091537 A1 | 4/2008 | Miller et al. | |
| 2008/0096594 A1* | 4/2008 | Vinding | 455/466 |
| 2008/0103689 A1* | 5/2008 | Graham et al. | 701/206 |
| 2008/0161018 A1 | 7/2008 | Miller et al. | |
| 2008/0189099 A1* | 8/2008 | Friedman et al. | 704/8 |
| 2008/0232561 A1* | 9/2008 | Hildreth et al. | 379/88.22 |
| 2008/0249370 A1* | 10/2008 | Birnkrant | A61B 1/00105 600/188 |
| 2008/0297512 A1* | 12/2008 | Sanchez | E02F 9/26 345/440 |

\* cited by examiner

DYNAMIC AWARENESS INVOLVING LOCATION

BACKGROUND

Conventional experiences with devices or machines that people come in contact with at differing locations are such that devices are often individualized and contain no corporate knowledge of prior experiences or situational data. For instance, if one were standing at a point in space such as overlooking some scenery, he or she may be completely unaware of the prior experiences or relevant information that is associated with the particular location.

A common experience for the modern age is the proliferation of hand held devices where people are often seen in their cars or as they walk listening to music or in many cases talking on their cell phones. One common music experience is the personal music device that allows one to store an abundance of music on a miniaturized hard drive. There are several competing technologies for the listener. For example, some devices were designed to be a music player only, where the interface, size, storage ability, and general design all enhance this function. Other type devices were designed to be a music/movie/game player. The music only type devices tend to require using a proprietary library that can be both an advantage and a disadvantage. For instance, the proprietary systems tend to do a good job ripping CDs, creating play lists, and organizing tunes. However, one is also locked into the respective proprietary program. This basically implies that a third party company controls one's music library, controls what can and cannot be listened to, and can even control how long one can listen.

In the alternative music/game players, direct access is given to the device's memory content. One can even remove memory and alter the content via an external reader, or swap it out with another memory stick. The downside is that usage is more technologically complex to figure out how to put music onto the memory stick. For instance, if MP3 files are employed, it's a matter of dragging-and-dropping the files into the right folder. However, if one wants to rip a CD and upload it to the player, they will have to either know a little about computer memories or buy a program. Some people would rather have more control, and whereas others may prefer the computer to do the thinking for them.

Other than provide a platform to listen to music or receive some other type of media such as movies or games, current devices lack any type of context above and beyond the music that is pre-selected by the user. Thus, additional information or experience is not provided to the user that may in fact enhance the current experience. For instance, when listening to a current song at a given location, the user may be completely unaware that there is some connection to the present location in view of the given song. Not only do current music devices lack a sense of location, but they also do not tie into any data above and beyond that predetermined by the respective user. Such devices are lacking in that functionality is missing that may be of considerable value to users.

The most common type of device is the cell phone which has added functionality as time goes by. Original cell phones were bulky and had low battery storage capabilities. Modern phones in addition to providing excellent voice/communications capabilities also include other functions such as cameras, keypads, textual capabilities, and Internet connections. Some phones include the ability to locate where a given user is. Unfortunately, as is the case with music only devices, the ability to locate is not tied in with any additional context that may be of valuable assistance to the user. For example, users may rate a cell phone for Sound Quality, Speakerphone, Ring tone Volume, Strength of Signal Reception, Keypad, Display, Selection of Features, Text Messaging, and Camera yet not question the type of data features that may be missing from the experience. It may be nice to know that one is located in a suburb west of the city but it may be entirely useful to know contextual data associated with the suburb.

Still yet other type of devices include person digital assistants that often combine features from cell phones, music players, and other devices. These devices do not make up for the noted deficiencies of mobile phones and music players however.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Communications and location-enabled components provide for dynamically increasing one's awareness in view of a given location. Location-based technologies can be employed as a trigger to dynamically deliver information to users when they come within vicinity of a given location. Users can exploit past experiences of other users that are associated with a given location or dynamically receive information that may be of some utility in view of the location and/or in view of the location at a particular point in time. For example, this could include providing a dynamic bumper similar to a clip from old time radio where an idea is pushed at a particular point in time and in view of the given location. In another example, this can include sharing a play list, providing context relevant to music someone hears, or one's location when a related song or information is playing. One particular example includes if a person walked past the field that inspired the song "Strawberry Fields Forever" by John Lennon, a story or song could be played when a user came in vicinity of the location. This could include bumping information via localized kiosks or locating users via a device such as a cell phone and pushing localized content to the device. Prior user experiences can also be cached and pushed so users can share experiences when they arrive at common locations.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Systems and methods are provided for delivering dynamic data content in view of a person's detected location and context. In one aspect, a system for dynamic content delivery is provided. The system includes a control component to determine location, preferences, and state of a user. A delivery component dynamically selects and provides content to the user as a function of the user's location, preferences, and state. Location components can be employed to detect a user's location where mobile devices and/or localized delivery systems can deliver dynamic content to the user based on the detected location.

As used in this application, the terms "component," "location," "profile," "database," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
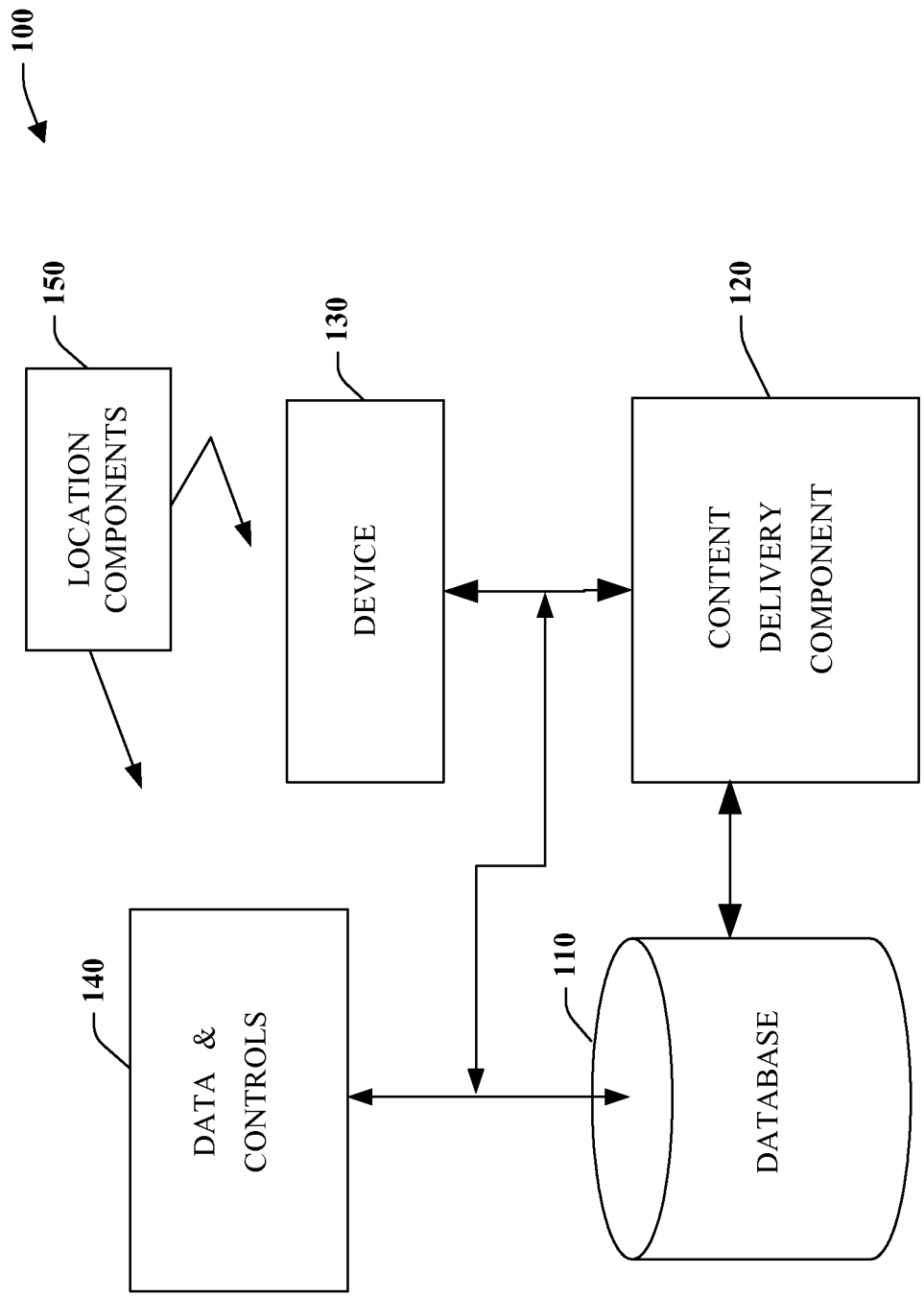
FIG. 1 is a schematic block diagram illustrating a dynamic awareness system to facilitate data exchange.

Referring initially to FIG. 1, a data awareness system 100 is illustrated to facilitate dynamic data exchange with users in view of a given location. The system 100 includes a database 110 (or databases) that stores information related to a given location. Such information can be stored locally in a local store and/or retrieved from remote locations such as over the Internet. A content delivery component 120 (or delivery component) accesses the database 110 and provides relevant or contextual data to a user via device 130. It is noted that the device 130 is shown in a general sense in that the device could be a mobile wireless device that communicates with the delivery component 120 and/or could be part of a local device such as a kiosk display or audio speaker for example. Based upon a detected location, and one or more controls that are selected in a data and controls component 140 (or controls component), information from the database 110 is presented to the user via the device 130. For example, if the device 130 were detected to be within range of a given location, information from the database 110 can be provided upon such detection.

Location detection can include local detection components 150 such as sensors that detect a user's proximity and/or detect from more sophisticated components such as a GPS system as will be described in more detail below. A user profile (described below with respect to FIG. 2) can be entered and updated via the controls component 140, where the controls determine if potential information that is triggered by the detected location should in fact be sent to the user at a given time. In essence, users can tailor their experiences as desired via the controls component 140. Also, in reference to other aspects, users can communicate data back to the location database 110 to update the database in view of their respective experiences. In this manner, location data is constantly being updated with fresh data for future users to receive when they have been detected in vicinity of the given location.

In general, the system 100 allows for dynamically increasing one's awareness in view of a given location. As can be appreciated, more than one device may be detected within vicinity of a given location and can receive similar or different data from the database 110. Information exchange can include providing a dynamic bumper similar to a clip from old time radio where an idea is pushed at a particular point in time and in view of the detected location. This could include sharing a play list, providing context relevant to music someone hears, or one's location when a related song or information is playing. Information can be bumped via localized kiosks or locating users via the device 130 such as a cell phone and pushing localized content to the device. Prior user experiences can also be cached at the database 110 and pushed so users can share experiences when they arrive at common locations.

Other location based dynamics include just in time mash-ups where movies or games are created and/or altered dynamically. This can include surveying the mood of a crowd via voting schemes and altering the content that is being presented at a given location. Thus, users can be invited to share a collective experience where they are invited to share rankings of a particular topic, event, game, disc jockey and so forth. Context sensitive information retrieval can employ whatever profile information about where users are, what users are doing, profiles, things on a list of likes and dislikes and so forth. This can include pulling information such as a list at grocery store or pulling information relating to someone that a person is talking to (such as their name) and provide some context for this person. As a person is walking in a city for example, data can be pushed relating to, e.g., museums they are in proximity to, attractions, features, and data regarding past user experiences with those locations. Thus, not only could one be told they are close to a famous restaurant but they could be provided with data and suggestion of others that have also visited. This could include matching profile information with other similar profiles in order to retrieve more relevant information.

In a device capture sense, if one were to take a picture (or capture audio as described below), connections could be made to localized or remote databases 110 that can pull information related to the given picture and again community data can be associated with the respective data capture. Beacon signals can be sent out to allow dynamic building of physical networks on the fly to allow people to collaborate near a given location and according to similar experiences.

The respective examples described herein will now be described in more detail below with respect to FIGS. 2-10. In another aspect, the system 100 can be employed as a location based information system. This includes means for detecting a user's location within a predetermined area (location components 150) and means for analyzing a profile associated with the user (controls component 140). The system can also include means for communicating information to the user (delivery component 120) based in part on the location and the profile.

Figure 2:
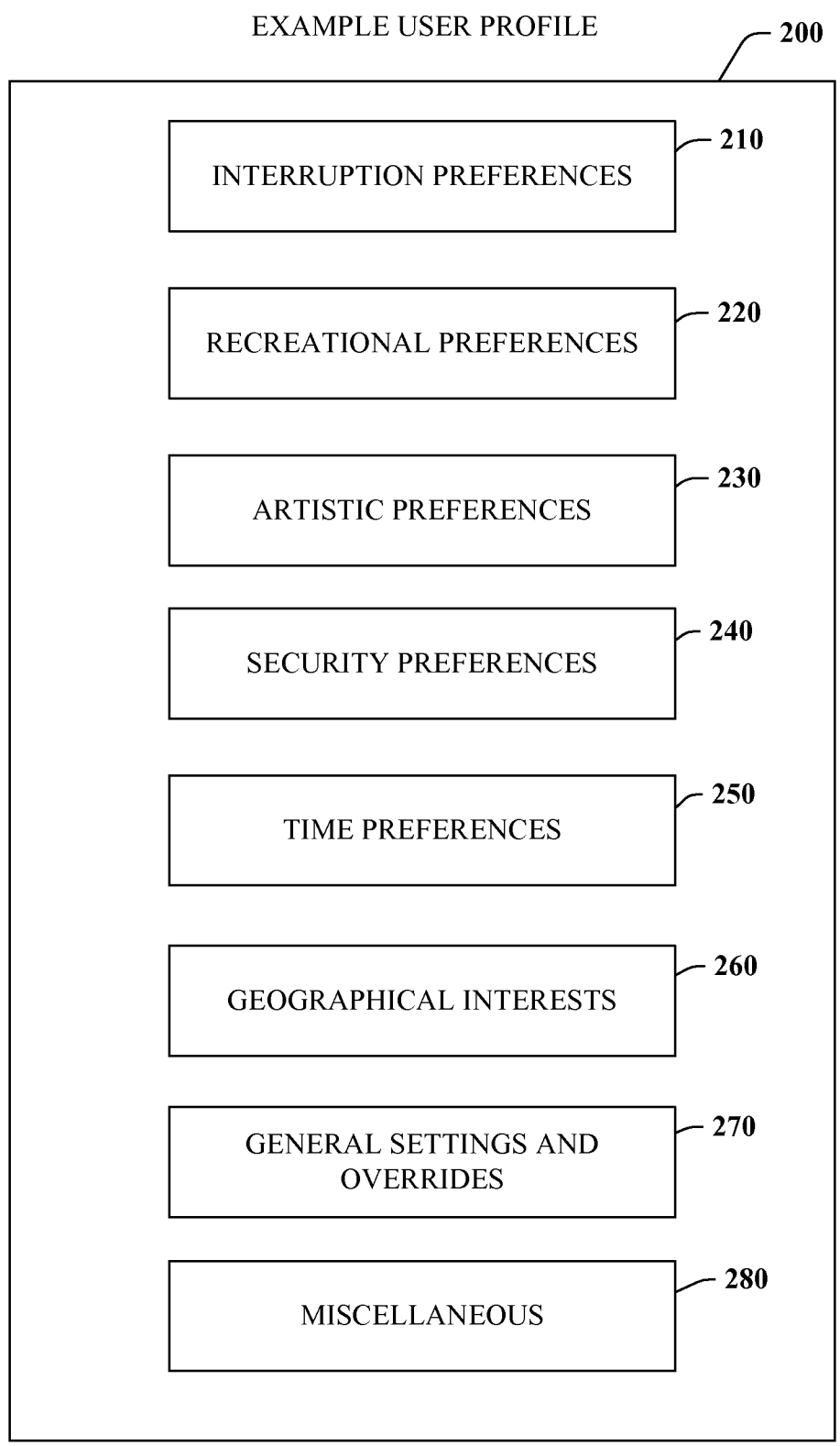
FIG. 2 is a diagram that illustrates an example user profile to control location information exchange.

Referring now to FIG. 2, an example user profile 200 is illustrated to control location information exchange. In general, the profile 200 allows users to control the types and frequency at which information may be provided to them. Some users may prefer to receive all information associated with a given location when they are detected within proximity thereof whereas others may desire information under more controlled or narrow circumstances. The profile 200 allows users to select and/or define options or preferences for receiving data. At 210, interruption preferences can be defined or selected. For example, restrictions can be placed on the times when location data can be sent to a user's device. Such examples include only sending location data during lunch hour, or restricting the data until the user has indicated they are on vacation. This could also include tailoring signals to indicate the presence of data but not giving a full data display or output. For example, the user may see a flashing icon or hear a beep indicating the presence of data and they could select further controls to see or experience the full data output at a given location.

Proceeding to 220, the user may indicate recreational preferences. For instance, the user may indicate that they jog at certain times of day and do not desire to receive data at those times. In another context, the user may indicate they are sports enthusiasts and desire to hear location information relating to sports but perhaps not other location data. As can be appreciated, recreational constraints can be placed over a plurality of differing circumstances. At 230, artistic preferences may be defined. This may include indicating movie, musical, or other artistic genres a user may be interested in such that when a user is in the presence of a given location related to those particular interests, information can be presented at that time. For example, a user interested in rock & roll may not desire to know about country & western information when visiting Nashville but may want to be informed when there is something about Elvis Presley that should be noted about a given location. Thus, if an old warehouse was passed where Elvis wrote his first hit, then the rock & roll enthusiast might be apprised of such information as they passed in vicinity of the respective building. Other aspects could include having security preferences, limitations or settings at 240 such that when a user is in a given location some/more information may be exchanged with others than when in some other location. This can include privacy settings to control how much is revealed with respect to a given user or location.

Proceeding to 250, time preferences can be entered. This can include absolute time information such as only provide information updates on weekends, or do not show information during lunch hour, or other time indication. Ranges can be specified such as please provide location information between 2:00 and 4:00 each afternoon. This can also include calendar information and other data that can be associated with time or dates in some manner. At 260, geographical interests can be indicated to tailor how location information is presented to the user. For instance, some users may not want to be bothered while at work in the city yet prefer their data in more rural locations. Whether a location is rural or not can be defined by available demographics or by user-declared fiat if desired. Databases and interfaces can be provided to allow a plurality of differing designations for when and/or where to receive respective information. This could include mountainous designations, water locations, state designations, and/or country designations for example.

Proceeding to 270, general settings and overrides can be provided. These settings at 270 allow users to override what they generally use to screen information. For example, during normal work weeks, users may screen out almost all location based data that may be available to them via the profile 200. When they arrive somewhere on vacation for example and possibly desirous of learning more about a new location, the user may want to simply disable one or more of the controls via the general settings and overrides 270. At 280, miscellaneous controls 280 can be provided. These can include if then constructs or alternative languages for more precisely controlling if and when available data detected for a location is pushed to a user.

The user profile 200 can be updated in several instances and likely via a user interface that is served from a remote server or on a respective mobile device itself. This can include a Graphical User Interface (GUI) to interact with the user or other components such as any type of application that sends, retrieves, processes, and/or manipulates data, receives, displays, formats, and/or communicates data, and/or facilitates operation of the system. For example, such interfaces can also be associated with an engine, server, client, editor tool or web browser although other type applications can be utilized.

The GUI can include a display having one or more display objects (not shown) for manipulating the profile 200 including such aspects as configurable icons, buttons, sliders, input boxes, selection options, menus, tabs and so forth having multiple configurable dimensions, shapes, colors, text, data and sounds to facilitate operations with the profile and/or the device. In addition, the GUI can also include a plurality of other inputs or controls for adjusting, manipulating, and configuring one or more aspects. This can include receiving user commands from a mouse, keyboard, speech input, web site, remote web service and/or other device such as a camera or video input to affect or modify operations of the GUI. For example, in addition to providing drag and drop operations, speech or facial recognition technologies can be employed to control when or how data is presented to the user. The profile 200 can be updated and stored in substantially any format although formats such as XML may be employed to capture user controls and instructions.

Figure 3:
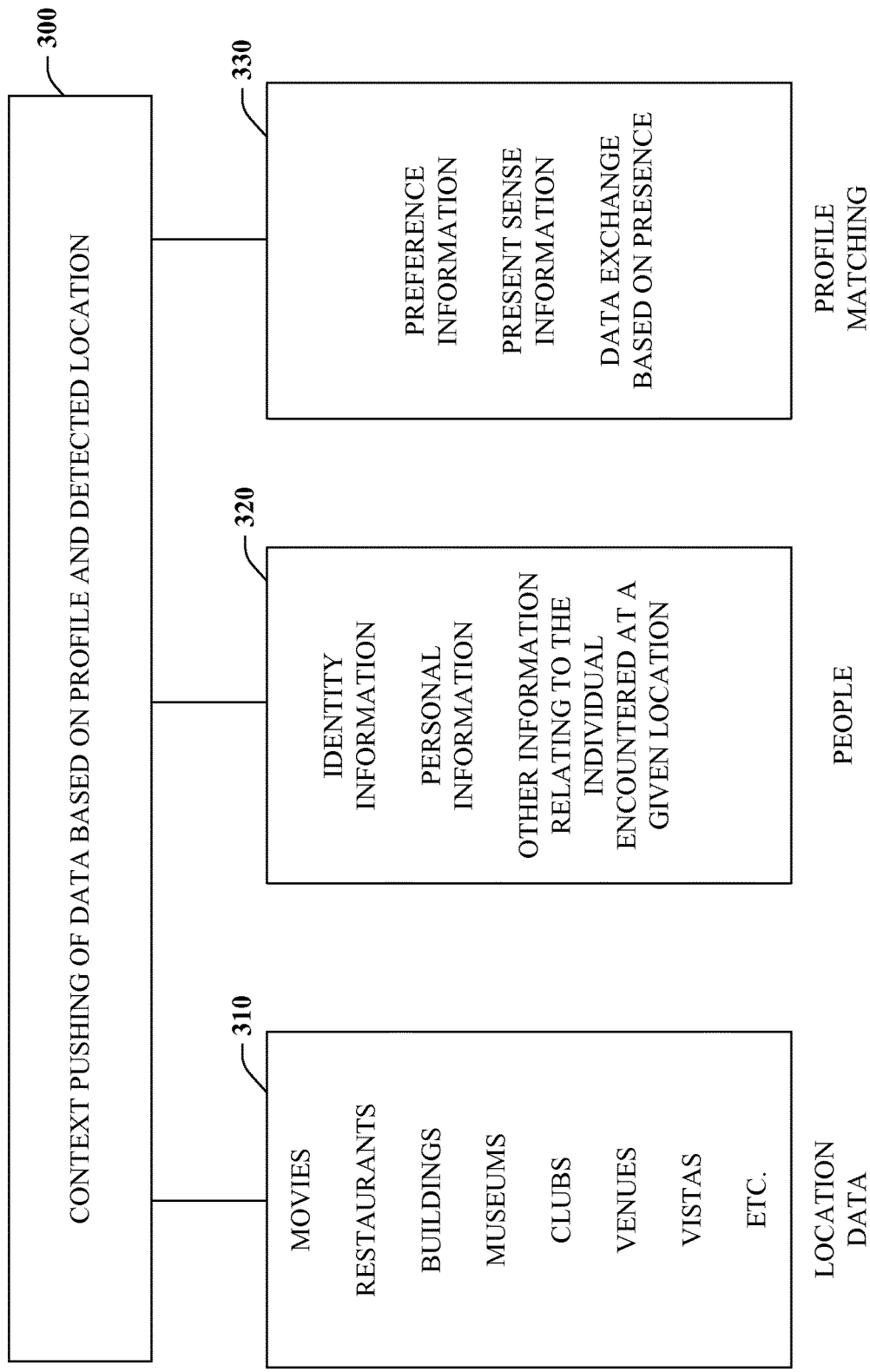
FIG. 3 is a diagram that illustrates context pushing of data based on location and profile information.

Turning to FIG. 3, context pushing of data based on location and profile information is illustrated at 300. Such location information can be provided to users based on several factors. At 310, location data is pushed to people based on spatial relationships to a location or structure such as a building. For example, as one walked past a movie theater and their location was detected, a movie review or other information relating to the theater could be directed to the user. Other type venues and locations include museums that can direct information about the contents of the museum or other notable information such as upcoming exhibits or displays. When located near a restaurant or other business, users can receive information relating to the menu for example, nightly specials, or special discounts that may be available at that point in time.

As noted above however, users may chose to regulate or control the type of information they receive based upon settings they have made in their respective profiles. Other type buildings that may include clubs or entertainment venues that may be of interest to a particular user that happens upon a given location. In more outdoors settings, location detection can trigger information to the user based upon a given scene or setting that the user may visit. For example, a scenic view in the Grand Canyon may trigger a story about Butch Cassidy and the Sundance Kid and who they hid out at the respective scene or vista in the past. Another story may include how the Colorado River created an unusual geologic formation. As can be appreciated, data can be pushed with respect to substantially any location or structure.

Proceeding to 320, information can be exchanged when people are detected in proximity to other people or users. In these instances, profiles and privacy considerations may exclude some users from receiving information from other users. However, when someone detects the presence of a trusted user, then information regarding the other user can be exchanged. This can include identity information. Thus, queues can be given that identify the other trusted party such that if someone were to approach another user, their identity or name could be provided as a memory aid. Personal information could be exchanged at 320 such as the type of mood someone were presently in or some information like recently retired or on vacation the past three weeks. Generally, users can update their profiles with audio clips or other media data such as text data that provide personal information that may be shared when encountering other users in proximity of a given location.

At 330, another type of information exchange may include profile matching and associated data exchange. In this example, the user may not know the other user they are in proximity with but based on received profile information and in view of the location of the other user, that user may be willing to exchange information with the other user. For instance, when observing Niagara Falls, a user may send out via a localized beacon signal to all users within 100 yards of themselves a generalized question about some event they are observing, for example witnessing some natural event that may be presently occurring. If other users having similar profiles are alerted, they might be able to provide additional information at the location. This can include present or past sense information collected by the user. Again, privacy considerations can include or exclude people from actually knowing who they are talking to depending on the comfort level and profile settings of the respective user. Thus, based on a given profile and preference settings, users can dynamically exchange data with other users in a given location or area, where identities can be made aware or kept in private depending on profile settings.

Figure 4:
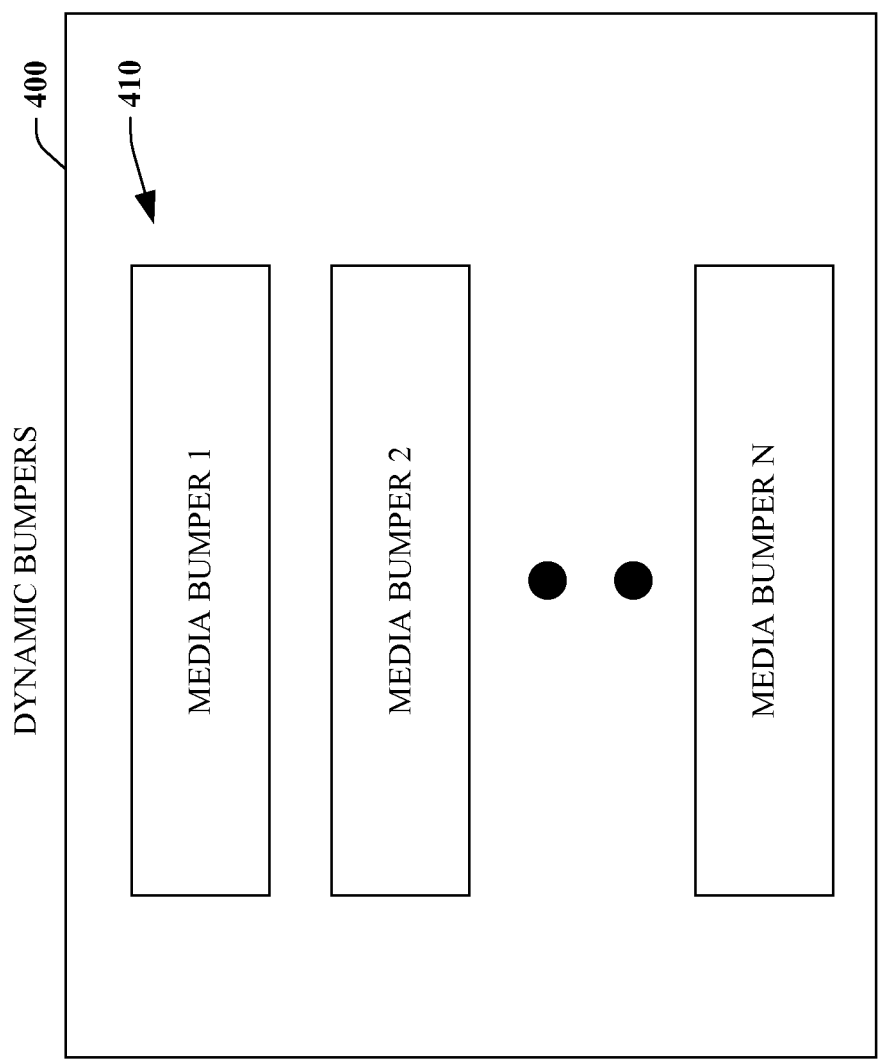
FIG. 4 illustrates dynamic bumpers that provide location based information.

Referring to FIG. 4, dynamic bumpers 400 for exchanging location based location based information are illustrated. Dynamic bumpers 400 include media ports 410 that provide one or more media exchange points to receive data. These can include audio bumpers to hear different presentations, video or picture bumpers for visual data, or other style sensory outputs such as textures or scents that can be automatically changed based on differing circumstances and times. For example, the media bumpers 410 could include a plurality of messages that are broadcast over speakers as users come in proximity to a location. Perhaps in the morning one message is given, whereas a different message is provided in the afternoon and the evenings. In another example, a video display provided at a hand held device or output at a localized kiosk display can bump from one type of message to another based on detected circumstances, times, or substantially any condition. For example, based on a given users profile, one type of information may be bumped at 400 versus another type. For example, at one location, information may be provided that Neil Young crafted a famous song while overlooking a selected mountain range. For someone whose profile indicated an interest in this genre, a song could be played when in proximity of the range or other factual information could be pushed. In other cases where users were not so inclined to care about music in general or folk/rock specifically, the information could be withheld entirely. In yet another example, if a user were visiting a location such as in the dry time of year, scents could be automatically bumped to the user to indicate an aroma during the rainy season of the year. Similarly, vibrations or other sensory perceptions could be induced to simulate natural phenomena such as earth quake vibrations or flash flood sounds. Substantially any type of sensory output can be pushed at 400 based upon a detected location of the user.

Figure 5:
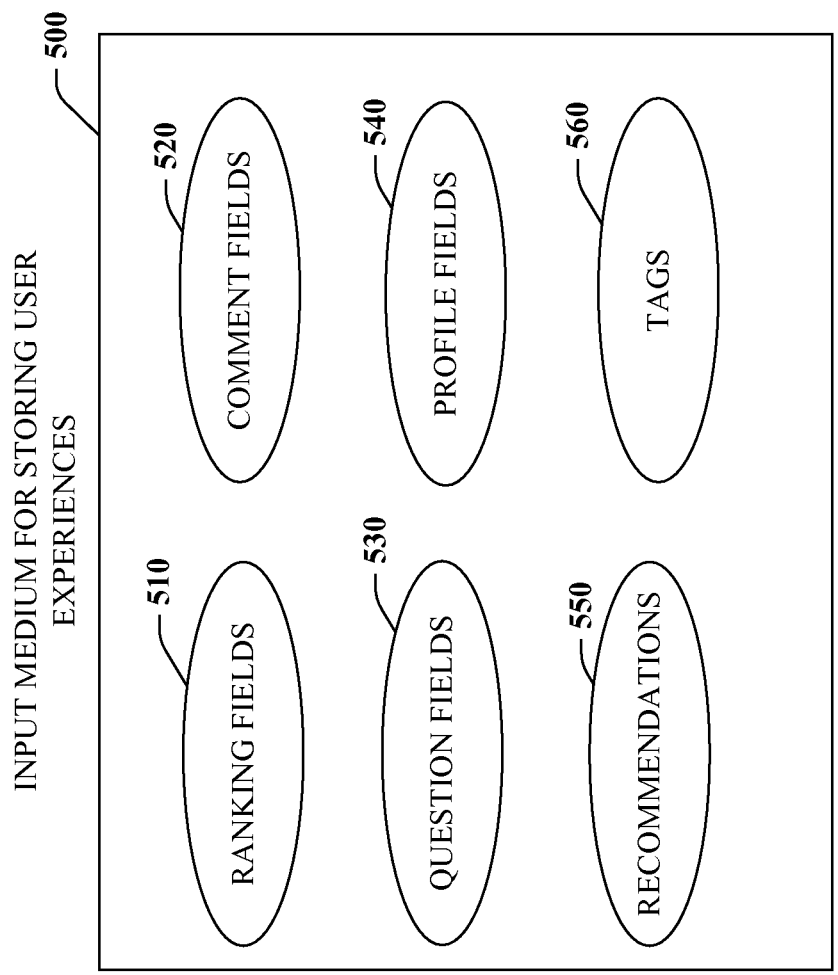
FIG. 5 illustrates input media for storing user experience data.

Turning to FIG. 5, input media 500 is illustrated for storing user experience data. As noted above, location based data can include predetermined data that has been associated with a location but can also include previous user's experiences with a location or area. The input media 500 can be interfaced via a device user interface or an interface served locally, or an interface served to the device that can be an XML file or other format. The input media 500 can capture user's impressions of a given location that can be stored and experienced by other users. It is noted that such media 500 can be associated with substantially any location if specifically tagged for the location. For instance, if a user were out in the wilderness and tagged a particular GPS coordinate, a user file could be stored in a global database. When some other user came within proximity of the coordinates, the data stored in the global database could be pushed via wireless signals to the device.

As shown, the input media 500 includes several inputs for recording user experiences that can be shared with subsequent users at a given location. At 510, ranking fields can include survey information provided by the respective users showing there likes or dislikes of a given location. At 520, comment fields include generalized feedback from users regarding their impressions. This can include textual data, audio data, video data or combinations thereof. Proceeding to 530, question fields can provide data regarding answers to predetermined questions provided about a location. At 540, profile fields can share information regarding the types of users who have provided data. In some cases, this may include personal or identity information if users were so inclined to enter such data. At 550, other recommendations can be provided by users. This may include information that supplements given location information. For example, providing information that indicated that 200 yards upstream a beautiful waterfall was discovered and the like. At 560, tag information can be provided. As noted above, tags may store specific GPS or other location information that is then tied to information stored on a globally accessible database. Such tags 560 can then be employed by other users to acquire data regarding a specific location and often places that are not associated with mainstream tourist destinations.

Figure 6:
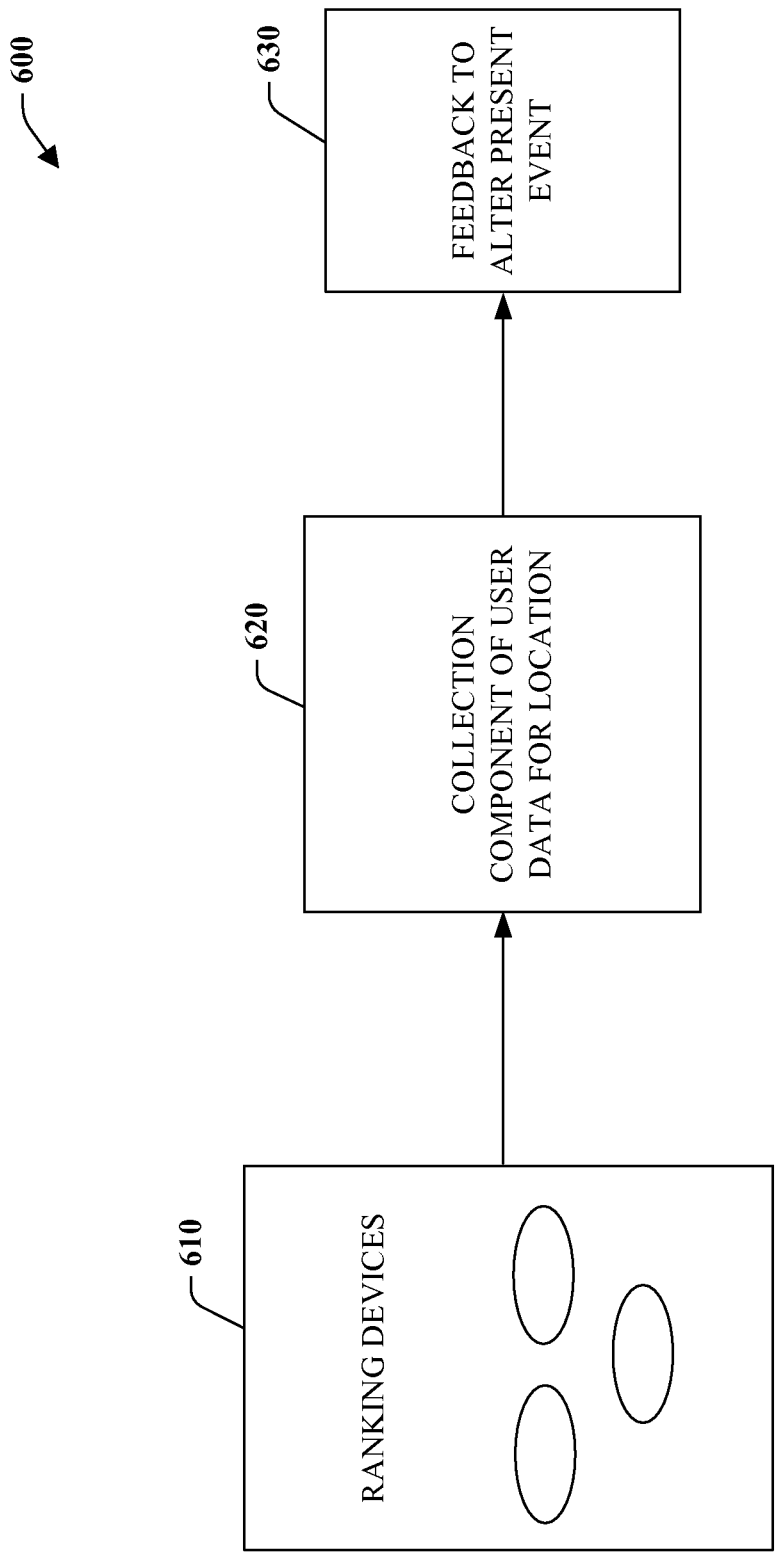
FIG. 6 illustrates location based feedback for dynamically altering event outcomes.

Referring to FIG. 6, a system 600 illustrates location based feedback for dynamically altering event outcomes. The system 600 relates to dynamic situations and locations such as movie theaters, concerts, plays, political events, DJ events, and so forth that can be dynamically altered or adjusted based upon feedback generated by users within vicinity of a given location. The system 600 includes one or more ranking devices which could be provided at an event or can be electronic interfaces that are received at wireless devices such as cell phones, PDA's or music devices, for example. Data generated by the ranking devices 610 can be gathered and analyzed by a collection component 620 where the collective mood of a group at the location can be determined.

Based on the determined mood or other criteria at 620, feedback 630 can be presented to the organizers or sponsors of an event where presentations at the event can be changed or altered. For example, a DJ operating a local night club may receive feedback 630 from a plurality of users that disco music is preferred over some other alternative format. Other indications may include letting the DJ know that music is being played too loudly or not loudly enough for example. In a political setting example, candidates at a debate can receive immediate feedback 630 on their responses and alter further responses based on such feedback if desired. As can be appreciated, substantially any type of event that is open to the public can employ audience feedback 630 from the venue to dynamically alter a given presentation. Marketers can also employ feedback 630 to adjust sales offerings to the group if desired. Based on profile information however, some users may not be enabled to receive such solicitations however.

Figure 7:
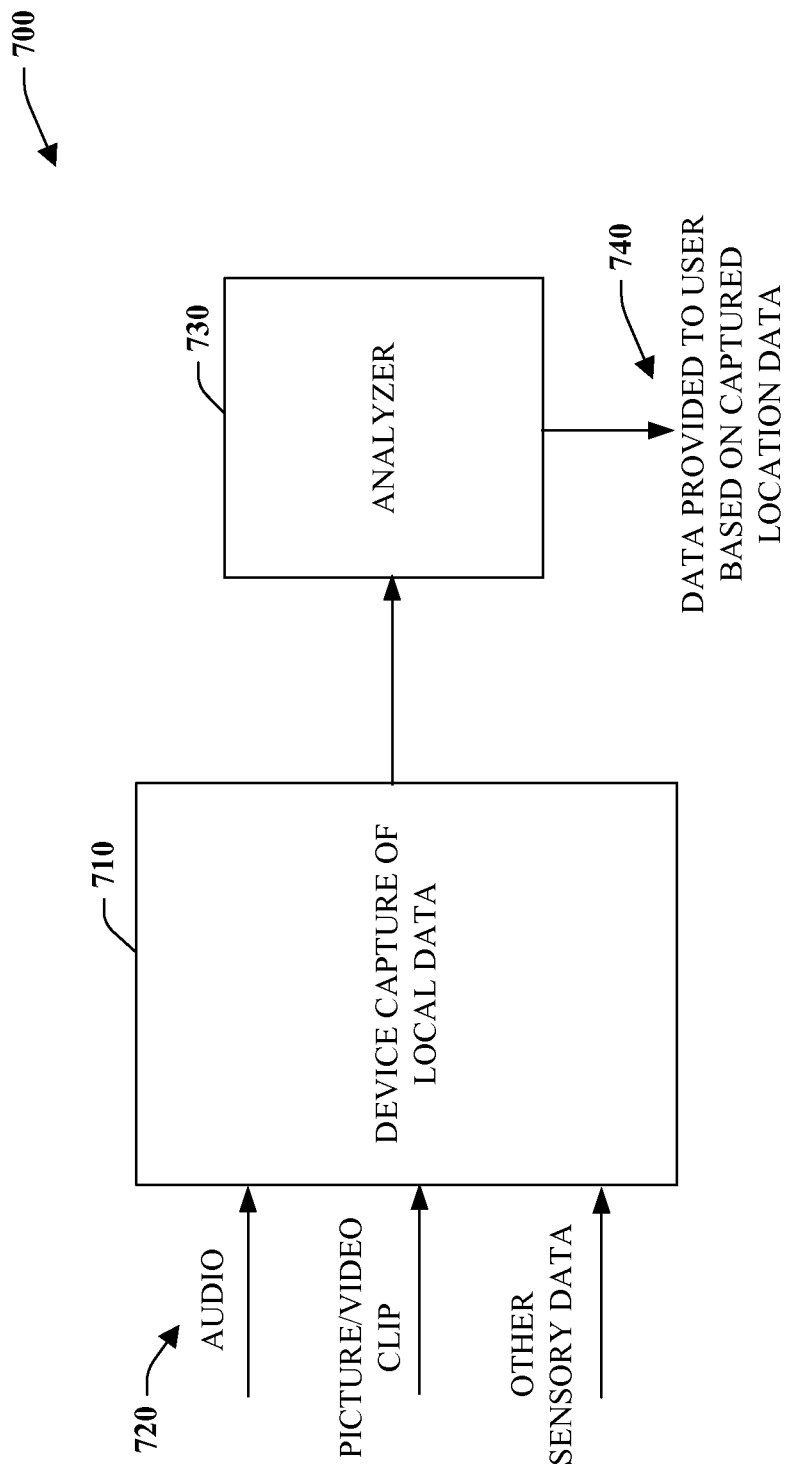
FIG. 7 illustrates local capture of data that is analyzed to present related location based information.

Referring to FIG. 7, a system 700 illustrates local capture of data that is analyzed to present related location based information. In this aspect, the system 700 allows one to capture information via a device at 710. This could be a cell phone or other device that captures audio data, picture data, video data, or other type of sensory data at 720. Based on the respective capture of data at 710, an analyzer 730 receives the data and determines if there is any related location information associated with the capture. If data is available via the analyzer 730 determining related data, the available data is provided to the user at 740. For example, the device 710 may capture an image of a statute or plant at a given location. The image is then transmitted to the analyzer 730 either at the location or associated with the location via remote processes.

If the analyzer 730 detects that the plant or the statue is similar to other images previously stored, then location data is pushed relating to the image at 740. For instance, an image taken of a statue of Thomas Jefferson could be transmitted to the analyzer where further information relating thereto could be provided. This could include why Jefferson was so honored at this particular location and who was involved with generating such honors. With respect to a plant or tree from the location, an identity could be made. Perhaps a mushroom or other toxic plant could be identified. As can be appreciated, substantially any image can be analyzed per a given location. In another example, an audio clip of a bird singing could be analyzed and identified per the respective location. If other type sensors were employed such as analyzing scents for examples, other type of identifications and information could be pushed to the user based on the location and the identified sensory input.

Figure 8:
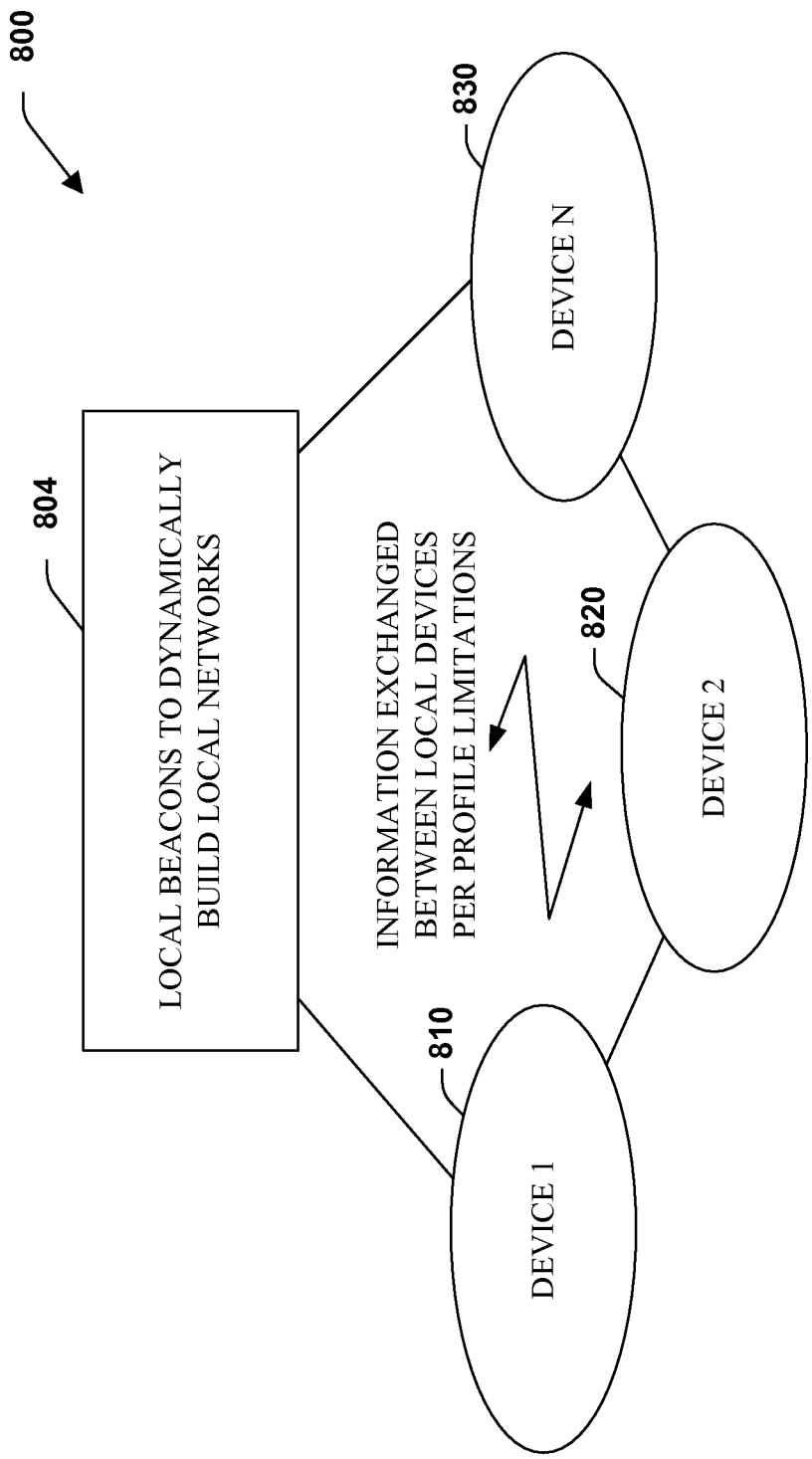
FIG. 8 illustrates building dynamic networks to share information based on location.

Referring now to FIG. 8, a system 800 illustrates building dynamic networks to share information based on location. In this example, local beacons 804 are employed to for a network between devices 1 though N illustrated at 810 though 830. The local beacons 804 can be localized wireless signals for example that are broadcast and employed by the devices to form the local network. From the local network that is formed, information can be shared and exchanged regarding people or other data surrounding the location. Similar to above, profile data can be used to control the amount and type of data exchanged between devices. This can include policy or security code settings to facilitate privacy for a given user. In addition to the local beacons 804 being transmitted to form the network, the devices 810-830 can transmit signals or codes that can be used to construct a respective network. For example, a code could be sent out looking for other like minded people or profiles. Devices responding to such codes could then be employed to form the localized network.

After the network has been formed, substantially any type of information can be exchanged between devices 810-830. This can include voice, video, picture or other media exchanges. Beyond localized social networks such as what may be formed in a club atmosphere, the networks may be useful to be formed in disaster or other type of emergency settings. For instance, during an emergency, some users may choose to remove any profile restrictions they have for receiving local data and globally decide to communicate with other users similarly situated at the location.

Figure 9:
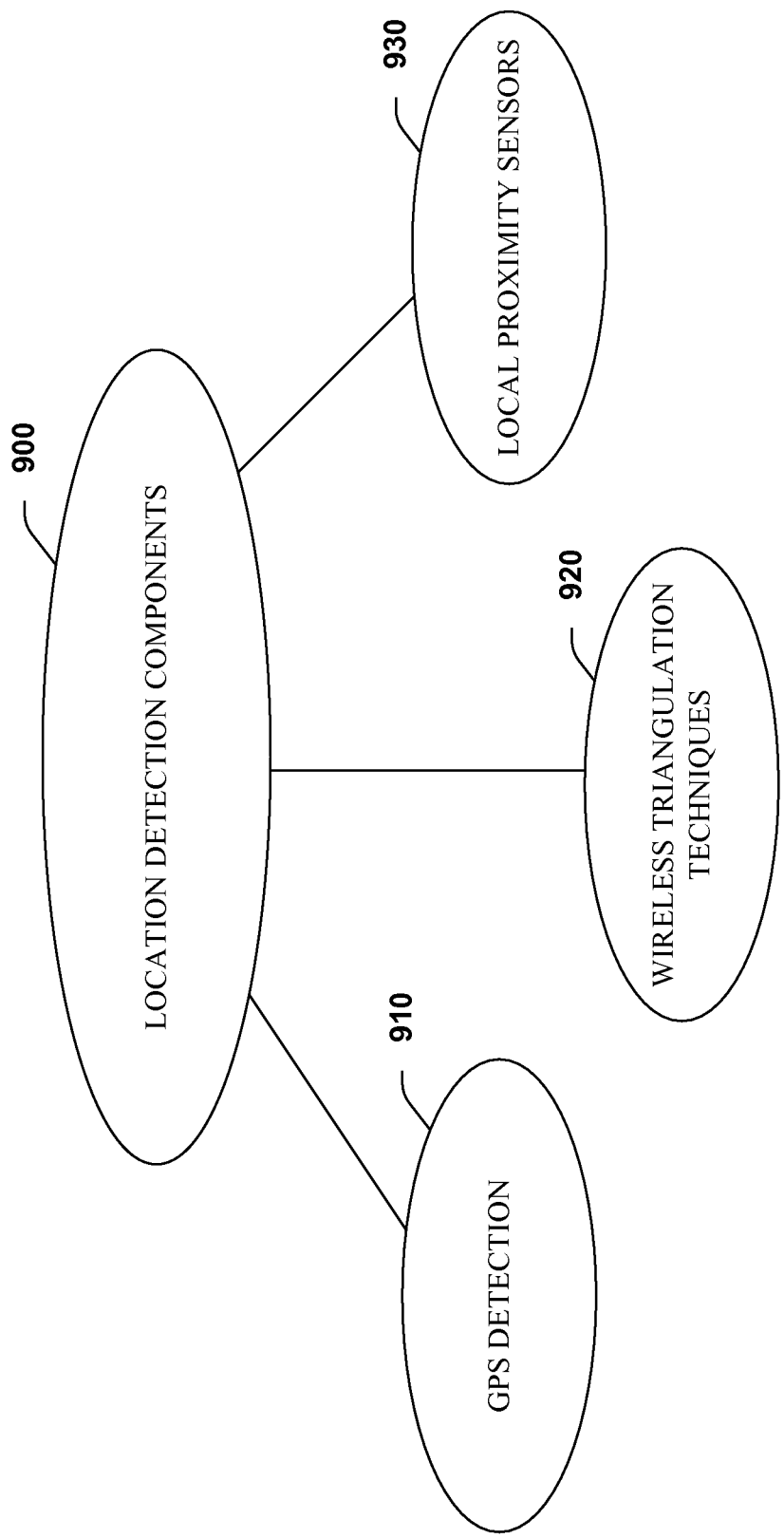
FIG. 9 illustrates example location detection components.

Referring to FIG. 9, example location detection components 900 are illustrated. In one example, global positioning systems (GPS) can be employed to determine location of a respective user. When the location has been determined, subsequent information can be pushed to the user in view of the respective location as previously described. In general, the Global Positioning System (GPS) is currently the only fully functional Global Navigation Satellite System (GNSS). Utilizing a constellation of at least 24 medium Earth orbit satellites that transmit precise radio signals, the system enables a GPS receiver to determine its location, speed and direction. The GPS has become a widely used aid to navigation worldwide, and a useful tool for map-making, land surveying, commerce, and scientific uses. GPS also provides a precise time reference used in many applications including scientific study of earthquakes, and synchronization of telecommunications networks.

Proceeding to 920, wireless triangulation or other wireless detection location techniques may be employed. In these examples, wireless phones by proximity to base stations and other cell towers can provide means to detect location of a given device. This may include geometric or other calculations to triangulate and determine a given location. At 930, local proximity sensors may be employed to detect a user's location. This can include accelerometers, laser-based detectors, optical sensors, motion detectors, sound or acoustic detectors, camera or video detectors and so forth that are situated with a given location and indicate a user's presence at the location. As can be appreciated, substantially any type of device or sensor 930 can be employed to detect a user's location at a given area. Upon detection by the local sensor 930, information can be presented via local output display or audio output or via transmissions to a mobile or hand held device maintained by the user. Thus, it is to be appreciated that combinations of wired or wireless technologies can be employed to detect location and subsequently communicate information to the user based on the detected location. For example, local sensors associated with an area could be wired to a centralized location for detecting a user's presence within the area. After presence has then been detected, location information could be wirelessly transmitted from the centralized server to the user's mobile device. As can be appreciated, various combinations of wireless and/or wireless configurations can be provided.

Figure 10:
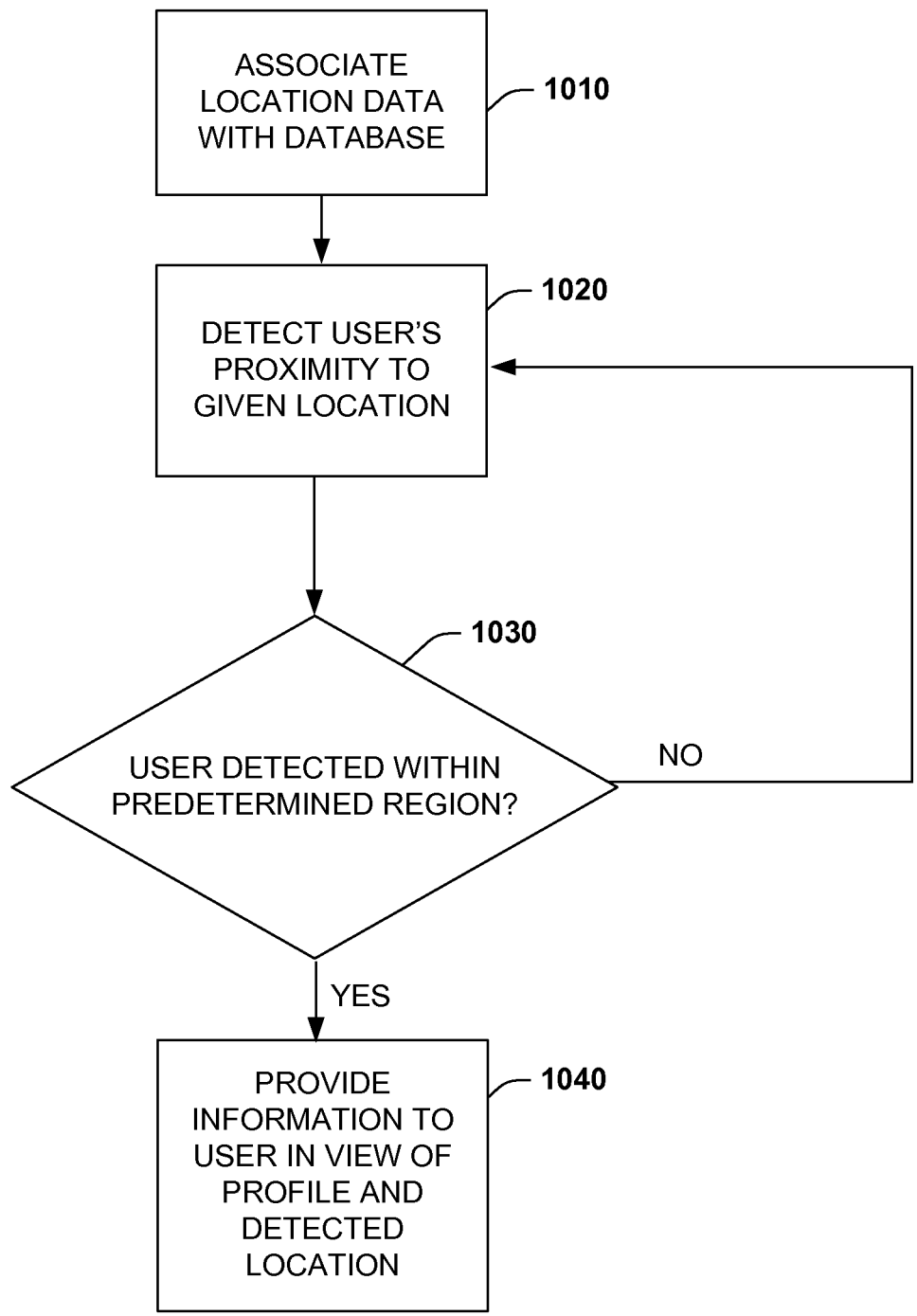
FIG. 10 illustrates a methodology to present dynamic data to users based upon a detected location.

FIG. 10 illustrates an exemplary process 1000 for receiving dynamic data based on detected location. While, for purposes of simplicity of explanation, the process is shown and described as a series or number of acts, it is to be understood and appreciated that the subject processes are not limited by the order of acts, as some acts may, in accordance with the subject processes, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject processes described herein.

Proceeding to 1010 of the process 1000, data is associated with a database or databases. These can include local data stores that house information for a given location or can be tied into global databases that can be accessed off the Internet, public network, or broadband network for example. Data stored in the databases can include predetermined information associated with a given location and can be tagged as belonging to a given location. Along with predetermined location information, bumper information can be provided along with dynamic data generated form actual users that have visited a respective location. At 1020, position devices are employed to detect a given user's location. Such devices could include local proximity detectors such as sound or laser detection or include more sophisticated detection such as GPS detection or wireless triangulation techniques.

At 1030, a determination is made as to whether or not a user has been detected within a given location. If a user has not been detected, the process proceeds back to 1020 and monitors for future user presence to the area. If a user has been detected at 1030, the process proceeds to 1040. At 1040, information is provided to the user based on the location detection at 1030. Depending on how the detected user's profile is set up can control how and what information is actually pushed to the user. As noted above, such information can include previous data generated by the user who have visited the detected location. Such information can be provide by a local device or display that remains at the location or can be pushed to a mobile or hand held device for example.

Figure 11:
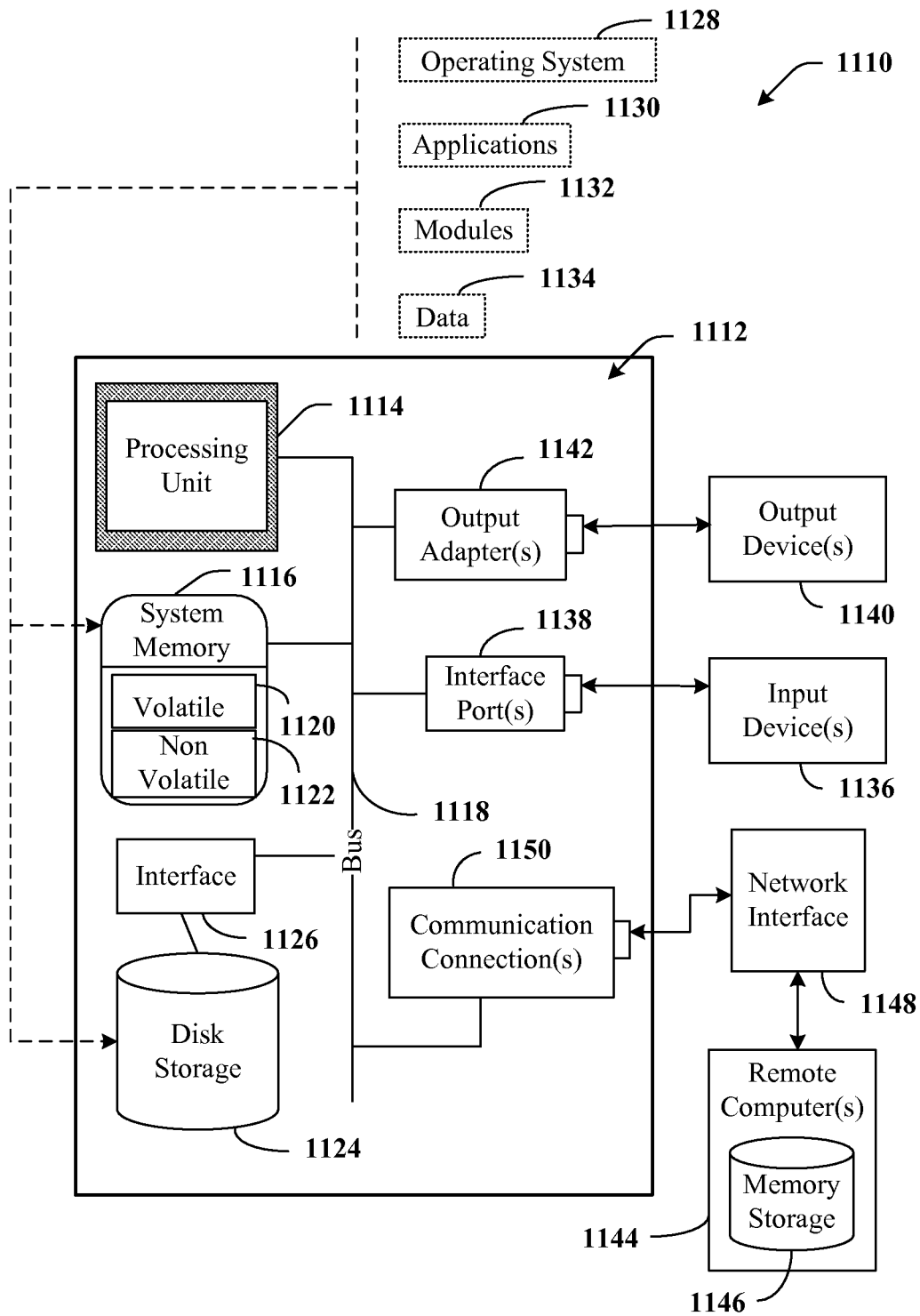
FIG. 11 is a schematic block diagram illustrating a suitable operating environment.
Figure 12:
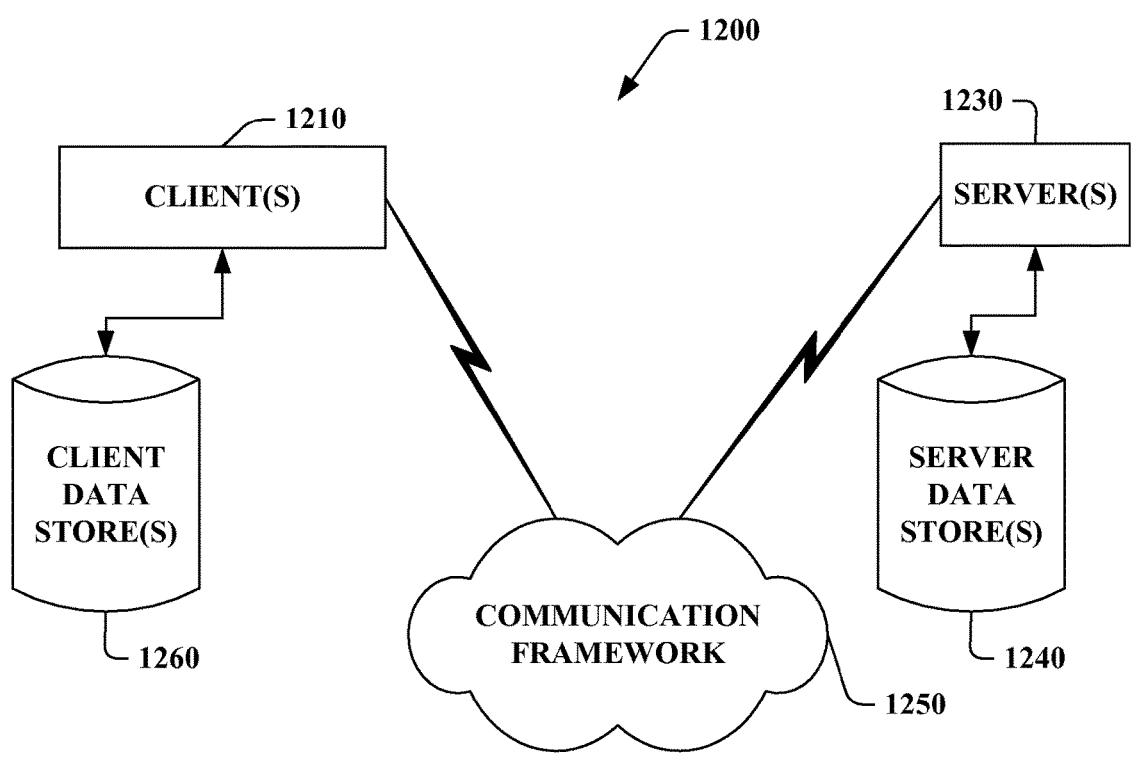
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that performs particular tasks and/or implements particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers.

In a distributed computing environment, program modules may be located in both local and remote memory storage devices.

With reference to FIG. 11, an exemplary environment 1110 for implementing various aspects described herein includes a computer 1112. The computer 1112 includes a processing unit 1114, a system memory 1116, and a system bus 1118. The system bus 1118 couple system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that various components described herein can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112 and to output information from computer 1112 to an output device 1140. Output adapter 1142 is provided to illustrate that there are some output devices 1140 like monitors, speakers, and printers, among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample-computing environment 1200 that can be employed. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the components described herein, for example. One possible communication between a client 1210 and a server 1230 may be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of providing location relevant data for a user of a mobile wireless device, the method performed by a server computing device, the method comprising:
   receiving, at the server computing device from the mobile wireless device, data captured by the mobile wireless device;
   receiving, at the server computing device, information that specifies a location of the mobile wireless device;
   receiving, at the server computing device, information that specifies a location of a disparate mobile wireless device, wherein a disparate user uses the disparate mobile wireless device;
   selecting the location relevant data for the user of the mobile wireless device, the location relevant data for the user of the mobile wireless device being selected by the server computing device from a database, the location relevant data for the user of the mobile wireless device being selected based on:
      the location of the mobile wireless device being within proximity of the location of the disparate mobile wireless device;
      the data received from the mobile wireless device; and
      a user profile of the user of the mobile wireless device;
      wherein the location relevant data for the user comprises personal information provided by the disparate user, the personal information provided by the disparate user comprises at least identity information of the disparate user;
   determining, based upon the user profile of the user of the mobile wireless device, whether to send the location relevant data for the user to the mobile wireless device from the server computing device; and
   responsive to determining to send the location relevant data for the user, sending the device.

2. The method of claim 1, wherein the user profile controls types of the location relevant data provided to the mobile wireless device.

3. The method of claim 1, wherein the user profile controls a frequency at which the location relevant data is provided to the mobile wireless device.

4. The method of claim 1, further comprising:
receiving disparate data relevant to the location from the mobile wireless device; and
updating the database with the disparate data relevant to the location.

5. The method of claim 1, wherein the location relevant data for the user comprises prior user experience data, the prior user experience data being previously received from at least one differing mobile wireless device other than the mobile wireless device or the disparate mobile wireless device.

6. The method of claim 1, further comprising:
detecting the disparate mobile wireless device within proximity of the location of the mobile wireless device;
selecting the location relevant data for the user of the mobile wireless device further comprising, based at least in part upon the location of the mobile wireless device and the disparate mobile wireless device detected within proximity of the location of the mobile wireless device, selecting data regarding the disparate user of the disparate mobile wireless device;
determining, based upon the user profile of the user of the mobile wireless device and a disparate user profile of the disparate user of the disparate mobile wireless device, whether to send the data regarding the disparate user of the disparate mobile wireless device to the mobile wireless device; and
responsive to determining to send the data regarding the disparate user of the disparate mobile wireless device, sending the data regarding the disparate user of the disparate mobile wireless device to the mobile wireless device.

7. The method of claim 6, further comprising:
based at least in part upon the location of the mobile wireless device and the disparate mobile wireless device detected within proximity of the location of the mobile wireless device, selecting data regarding the user of the mobile wireless device;
determining, based upon the user profile of the user of the mobile wireless device and the disparate user profile of the disparate user of the disparate mobile wireless device, whether to send the data regarding the user of the mobile wireless device to the disparate mobile wireless device; and
responsive to determining to send the data regarding the user of the mobile wireless device, sending the data regarding the user of the mobile wireless device to the disparate mobile wireless device.

8. The method of claim 6, wherein the data regarding the disparate user of the disparate mobile wireless device comprises a name of the disparate user of the disparate mobile wireless device.

9. The method of claim 1, wherein receiving the information that specifies the location of the mobile wireless device further comprises employing the server computing device to detect the location of the mobile wireless device.

10. The method of claim 1, wherein the data captured by the mobile wireless device comprises sensor data captured by a sensor of the mobile wireless device.

11. A method of providing location relevant data to a mobile wireless device, the method performed by a server computing device, the method comprising:
receiving, at the server computing device from the mobile wireless device, data captured by the mobile wireless device;
detecting a location of the mobile wireless device, wherein the location of the mobile wireless device is detected to be within a local area, and wherein the location of the mobile wireless device is detected by the server computing device;
detecting a disparate mobile wireless device within proximity of the location of the mobile wireless device;
selecting the location relevant data for the mobile wireless device, the location relevant data for the mobile wireless device being selected by the server computing device from a database, the location relevant data for the mobile wireless device being selected based on:
the location of the mobile wireless device;
the data received from the mobile wireless device; and
a user profile of a user of the mobile wireless device;
wherein the location relevant data comprises data regarding a disparate user of the disparate mobile wireless device, the data regarding the disparate user of the disparate mobile wireless device being selected based at least in part upon the disparate mobile wireless device being detected within proximity of the location of the mobile wireless device;
determining, based upon the user profile of the user of the mobile wireless device and a disparate user profile of the disparate user of the disparate mobile wireless device, whether to send the location relevant data comprising the data regarding the disparate user of the disparate mobile wireless device to the mobile wireless device from the server computing device; and
responsive to determining to send the location relevant data comprising the data regarding the disparate user of the disparate mobile wireless device to the mobile wireless device, pushing the location relevant data comprising the data regarding the disparate user of the disparate mobile wireless device from the server computing device to the mobile wireless device.

12. The method of claim 11, further comprising:
during a time period prior to when the location relevant data is pushed from the server computing device to the mobile wireless device:
receiving data corresponding to the local area from one or more mobile wireless devices within the local area, wherein the data received from the one or more mobile wireless devices within the local area comprises information captured by the one or more mobile wireless devices within the local area; and
storing the data corresponding to the local area in the database.

13. The method of claim 12, wherein the information comprises pictures of the local area.

14. The method of claim 11, further comprising:
receiving disparate data corresponding to the local area from the mobile wireless device; and
updating the database with the disparate data corresponding to the local area.

15. The method of claim 11, further comprising:
based at least in part upon the location of the mobile wireless device and the disparate mobile wireless device detected within proximity of the location of the mobile wireless device, selecting data regarding the user of the mobile wireless device;
determining, based upon the user profile of the user of the mobile wireless device and the disparate user profile of the disparate user of the disparate mobile wireless device, whether to send the data regarding the user of the mobile wireless device to the disparate mobile wireless device; and
responsive to determining to send the data regarding the user of the mobile wireless device, sending the data regarding the user of the mobile wireless device to the disparate mobile wireless device.

16. The method of claim 15, wherein the data regarding the user of the mobile wireless device comprises a name of the user of the mobile wireless device.

17. The method of claim 11, wherein the data regarding the disparate user of the disparate mobile wireless device comprises a name of the disparate user of the disparate mobile wireless device.

18. A server computing system that provides location relevant data, comprising:
- at least one processor; and
- memory that comprises computer-executable instructions that, when executed by the at least one processor, cause the at least one processor to perform acts including:
  - responsive to receipt of data from a mobile wireless device, selecting the location relevant data for a user relevant to a location of the mobile wireless device from a database, wherein the location relevant data for the user is selected based at least in part upon:
    - the location of the mobile wireless device being within proximity of a location of a disparate mobile wireless device, wherein a disparate user uses the disparate mobile wireless device;
    - the data received from the mobile wireless device; and
    - a user profile of the user of the mobile wireless device;
  - wherein the location relevant data for the user comprises personal information provided by the disparate user, the personal information provided by the disparate user comprises at least identity information of the disparate user;
  - determining, based upon the user profile of the user of the mobile wireless device, whether to send the location relevant data for the user to the mobile wireless device; and
  - responsive to determining to send the location relevant data for the user, causing the location relevant data for the user to be sent to the mobile wireless device.

19. The server computing system of claim 18, wherein the data received from the mobile wireless device comprises at least one of audio data, image data, or video data.

20. The server computing system of claim 18, the memory further comprises computer-executable instructions that, when executed by the at least one processor, cause the at least one processor to perform acts including:
- receiving information that specifies the location of the mobile wireless device.

* * * * *